United States Patent [19]

Schmidt et al.

[11] 4,146,703

[45] Mar. 27, 1979

[54] UNSATURATED HOMOPOLYMERIZABLE AND/OR COPOLYMERIZABLE POLYESTER RESINS

[75] Inventors: Karl Schmidt, Hamburg, Fed. Rep. of Germany; Hans Dannebaum, deceased, late of Ahrensburg, Fed. Rep. of Germany, by Ella Dannebaum, nee Supply, heir; Gerhard Brockmann, Hamburg, Fed. Rep. of Germany

[73] Assignee: Firma Dr. Beck & Co. AG, Hamburg, Fed. Rep. of Germany

[21] Appl. No.: 826,792

[22] Filed: Aug. 22, 1977

Related U.S. Application Data

[63] Continuation of Ser. No. 656,927, Feb. 10, 1976, abandoned, which is a continuation of Ser. No. 240,284, Mar. 31, 1972, abandoned, which is a continuation of Ser. No. 84,223, Oct. 26, 1970, abandoned, which is a continuation of Ser. No. 693,689, Dec. 14, 1967, abandoned.

[51] Int. Cl.$^2$ ............................................. C08G 63/68

[52] U.S. Cl. .............................. 528/289; 260/857 PA; 260/861

[58] Field of Search .......................... 260/857 PA, 861; 528/289, 273

[56] References Cited

U.S. PATENT DOCUMENTS

| | | | |
|---|---|---|---|
| 2,777,830 | 1/1957 | Shivers | 260/75 N |
| 2,806,822 | 9/1957 | Ott | 260/2.5 |
| 3,182,073 | 5/1965 | Loncrini | 260/346.3 |
| 3,238,181 | 3/1966 | Anderson | 260/65 |
| 3,454,673 | 7/1969 | Schmidt et al. | 260/868 |

FOREIGN PATENT DOCUMENTS 6413683  5/1965  Netherlands ......................... 260/75 M

*Primary Examiner*—Lucille M. Phynes
*Attorney, Agent, or Firm*—Sprung, Felfe, Horn, Lynch & Kramer

[57] ABSTRACT

Unsaturated homopolymerizable or copolymerizable polyester resins having incorporated therein at least one 5 or 6-membered cyclic imide group, and methods for their preparation are described.

16 Claims, No Drawings

UNSATURATED HOMOPOLYMERIZABLE AND/OR COPOLYMERIZABLE POLYESTER RESINS

This application is a continuation of Ser. No. 656,927, filed Feb. 10, 1976, now abandoned which is a continuation of Ser. No. 240,284, filed Mar. 31, 1972, now abandoned, which is a continuation of Ser. No. 842,223, filed Oct. 26, 1970, now abandoned, which in turn is a continuation of Ser. No. 693,689, filed Dec. 14, 1967, now abandoned.

Unsaturated polyester resins, the manner of their manufacture and their processing, are all well known. For example, unsaturated polyester resins can be manufactured by the copolyesterification of multivalent alcohols with multivalent carboxylic acids. Monovalent acids and monovalent alcohols can be used. Also, esterifying derivatives of the reactants can be used. In this context, at least one compound which is olefinically unsaturated and homopolymerisable or copolymerisable, is condensed into the polyester resin, and the mean functionality and ratio of hydroxyl to carboxyl groups must be so selected in accordance with the prior art rules that the formation of polyester is ensured. These resins can, in particular by the addition of radical-producing compounds and possibly by the addition of olefinically-unsaturated copolymerisable monomeric compounds, be hardened in thick layers to form thermosetting plastics. With the purpose of modifying the process products, the applicants have proposed that in the manufacture of unsaturated polyesters the monovalent carboxylic acids or hydroxyl compounds should be ones which contain at least one 5 or 6-membered imide ring. Older protective rights of the applicants also deal with the manufacture of so-called polyester imides, i.e. very generally polyesters of multifunctional carboxylic acids, multifunctional alcohols or hydroxy carboxylic acids which are characterised by the fact that they contain 5-membered imide rings. In the context of the older protective rights, saturated polyesters are especially referred to throughout. The unsaturated polyesters are amenable to homopolymerisation or copolymerisation in particular by the use of radicals to trigger the reaction, whereas the saturated polyesters are not, this even if they are not built up exclusively of saturated constituents but contain for example aromatic components.

The present invention relates to a further development within this class of polyester imides and is directed in particular to a process for the manufacture of unsaturated homopolymerisable and/or copolymerisable polyesters containing nitrogen, in a known reaction system, the novel and inventive modification of which process resides in the fact that in the manufacture of the unsaturated polyester resins at least one of the multifunctional reactants employed to form the polyester resin, contains one or more 5 or 6-membered imide rings.

Accordingly, the subject of the present invention is a process for the manufacture of unsaturated homopolymerisable and/or copolymerisable polyester resins from multivalent alcohols, multivalent carboxylic acids and/or hydroxy carboxylic acids, possibly using esterifying derivatives of these compounds, the said process being characterised in that there is incorporated into the polyester resin at least one multifunctional component possessing at least one 5 or 6-membered cyclic imide group. The process may include subsequent cross-linking of the unsaturated polyester resins by the use, in particular, of radical homopolymerisation or copolymerisation with copolymerisable monomers.

The advantage of the resins in accordance with the invention resides, amongst other things, in the high imide nitrogen content which is achieveable, in the excellent thermal resistance, a feature which is for example expressed in the small degree of dependence of the dielectric loss factor upon the temperature, in the facility to use exclusively bivalent basic materials to produce higher molecular unsaturated polyesters of a sort which can for example be employed for the manufacture of pressed articles, and in the versatility of the possibilities for synthesis which means that resins can be manufactured which have properties adapted to the particular application.

From the vast range of knowledge thus far amassed on the production of unsaturated polyester resins, we mention here some of the monofunctional and multifunctional reactants which can be employed in accordance with the invention. By way of alcohols, it is for example possible to use: Alkanols such as methanol, ethanol, propanol, isopropanol, cyclohexanol, tetrahydrobenzyl alcohol, tricyclodecanol, benzyl alcohol, etc., glycol, propandiols, butandiols, hexandiols, trimethylhexandiols, cyclohexandimethanol, 1,1-bis-hydroxymethylcyclohexene-3, tricyclodecandiol, tricyclodecanmonoglycerin ether, etc. etc. In this context, where the invention is concerned, diols with branched C-chains, such as neopentyl glycol, are particularly significant. By using these, the styrene tolerance of the unsaturated polyester is substantially improved. Again, trioles and tetroles such as glycerine, 2,3,5-hexantriol, pentaerythritol etc. can be used.

The carboxylic acids which can be used include lauric acid, olaic acid, benzoic acid, abietic acid and other monocarboxylic acids. The multivalent compounds may include succinic acid, adipic acid, ortho, iso and terephthalic acid, tetrahydrophthalic acid, hexahydrophthalic acid, hexachlorendo-methylenetetrahydrophthalic acid, tetrachlorophthalic acid, tetrabromophthalic acid, trimellitic acid, pyromellitic acid and other carboxylic acids which in accordance with the prior art are suitable for the manufacture of unsaturated polyesters.

The alcohols and carboxylic acids which have been listed may be used as reactants for the formation of the basic materials containing the imide groups, or may be employed in addition to the compounds containing the imide groups and to the olefine-unsaturated compounds, for example for modifying the properties of the end products.

Conventional homopolymerisable or copolymerisable olefine-unsaturated compounds used for the manufacture of unsaturated polyesters, and which can also be employed in accordance with the present invention, include for example: Acrylic acid, methacrylic acid, esters of these such as acrylic acid monoglycol esters or methacrylic acid monoglycol esters, allyl alcohol, methallyl alcohol, maleic acid, fumaric acid, itaconic acid, mesaconic acid, aconitic acid etc.

Instead of the free alcohols or acids, it is possible in known manner to use their functional derivatives such as esters, anhydrides, chlorides.

The compounds to be used in accordance with the invention, which contain one or more 5 or 6-membered cyclic imide groups, must also contain at least two functional groups which participate in the reaction through which the unsaturated polyester resin is developed. These functional groups will in particular be multivalent alcohols, multivalent carboxylic acids or hydroxy carboxylic acids or their esterifying derivatives. They will contain at least one 5 or 6-membered imide ring in the molecule. In a particularly important embodiment of the invention, the imide rings are furthermore so disposed in the molecule that the functional groups participating in polyester resin formation, are linked with one another via different members of the imide rings. Corresponding polycarboxylic acids and polyalcohols or oxycarboxylic acids are well known, in particular from the prior art which deals with the manufacture of saturated polyester resins containing imide rings. We refer here for example to British Specification No. 973,377 or French Specification No. 1,368,741. They can be manufactured in accordance with known processes, for example on the basis of compounds containing primary amino groups and of compounds which are able to form cyclic imide groups and contain at least two carboxyl groups in either $\alpha$, $\beta$ or $\alpha,\gamma$ positions, with the proviso that the basic molecules employed for the formation of a molecule containing imide groups, should collectively contain at least two further groups capable of esterification which are not required for amide formation. The bivalent and multivalent compounds containing the imide groups may be manufactured separately and then added to the reaction mixture employed for producing the polyester, or may equally well be developed directly in the reaction mixture from their basic materials, in the presence of other components of the polyester resin, this in the manner described in relation to saturated polyester resin in for example the said British Specification No. 973,377 or French Specification No. 1,368,741. However care must be taken in this case that the unsaturated polyester components, especially unsaturated polycarboxylic acids, are only added to the reaction mixture after sufficient an preferably complete formation of imide rings to exclude undesirable side reactions. Groups which are capable of esterification include primary or secondary alcoholic hydroxyl groups and carboxyl groups as well as groups derived therefrom, such as anhydrides, halides, esters, epoxides.

Examples of the compounds to be used in accordance with the present invention are the substances having the following formulae, which substances can be manufactured from the basic material listed in the second and third columns of the ensuing Table:

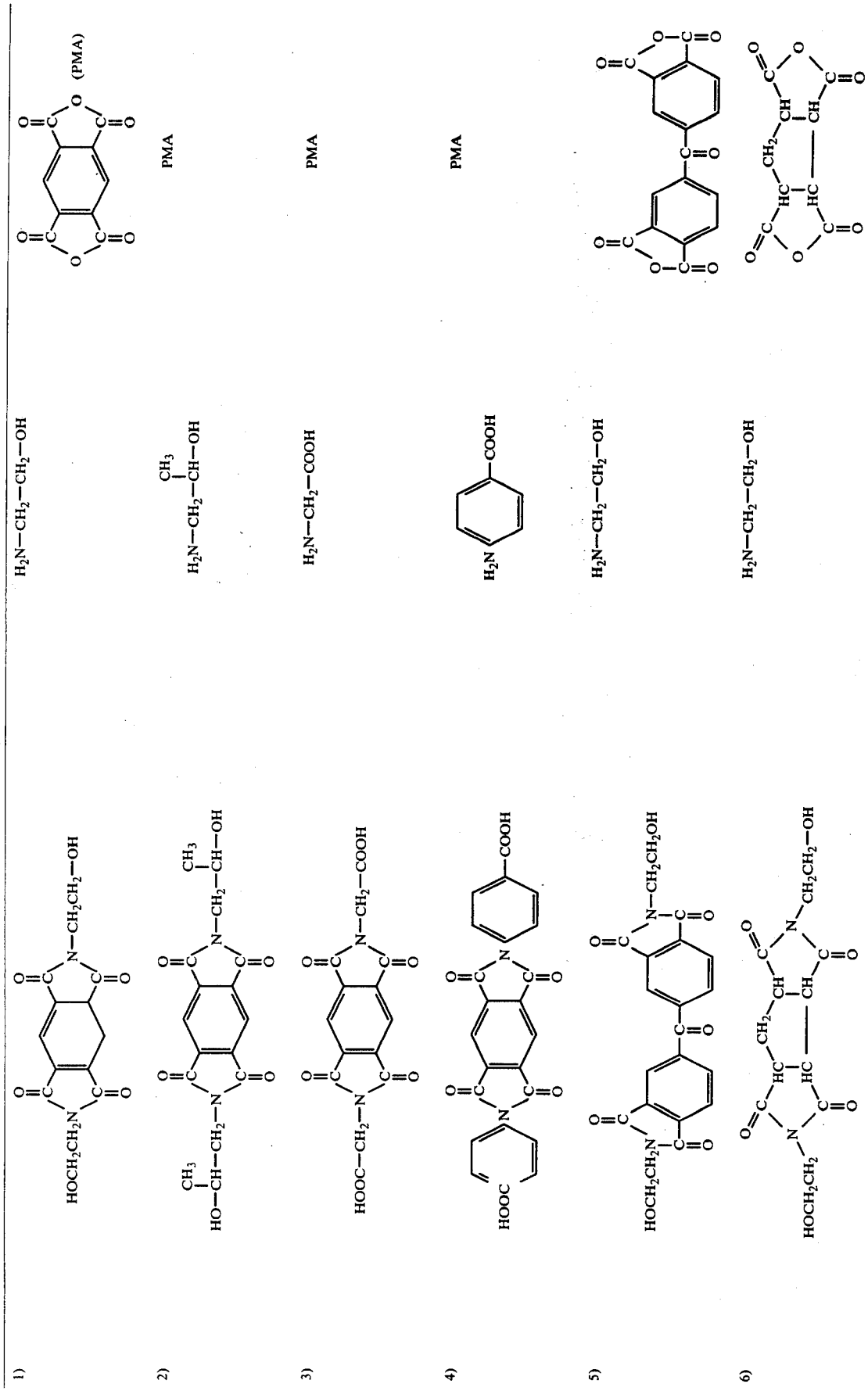

-continued
| | | |
|---|---|---|
| 7) | 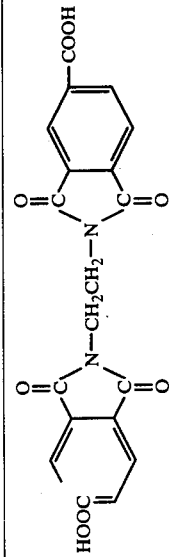 | H₂N—CH₂—CH₂—NH₂ 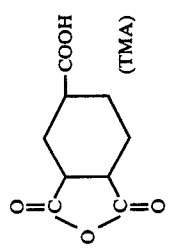 (TMA) |
| 8) | 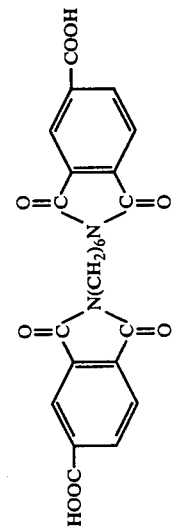 | H₂N—(CH₂)₆—NH₂ TMA |
| 9) | 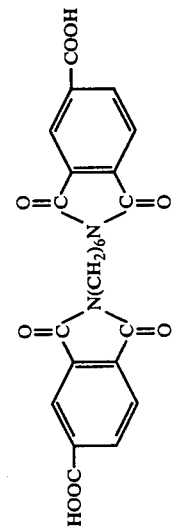 | CH₃   CH₃<br>  \|      \|<br>H₂N—CH₂—CH—CH₂—C—CH₂—NH₂<br>              \|<br>             CH₃<br>TMA |
| 10) | 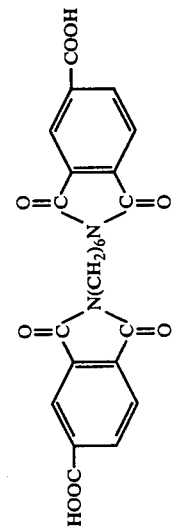 | 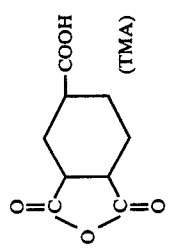 TMA |
| 11) | 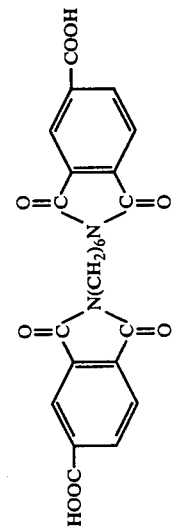 | 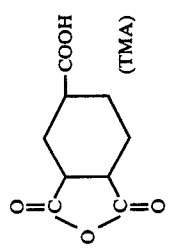 TMA |
| 12) | 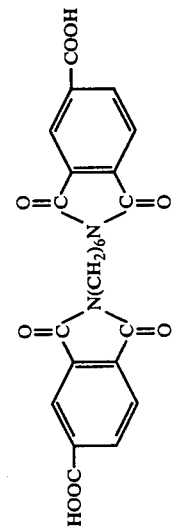 | H₂N—CH₂—CH₂—NH₂<br>COOH<br>\|<br>HO—CH<br>\|<br>CH₂—COOH |

-continued
| | | | |
|---|---|---|---|
| 13) | 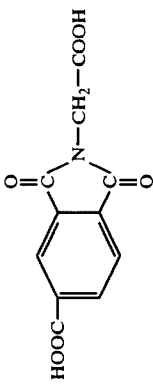 | H$_2$N—CH$_2$—COOH | TMA |
| 14) | 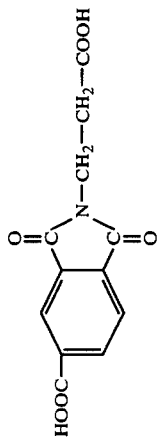 | H$_2$N—CH$_2$—CH$_2$—COOH | TMA |
| 15) | | CH$_2$—CH—CH$_2$<br>  \|    \|    \|<br>H$_2$N  OH  OH | 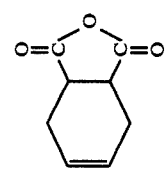 |
| 16) | |  | 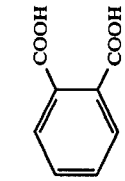 |

From the compounds 1 to 15 listed, it will be seen that in accordance with the invention it is possible for example to use reaction products of:
1. Tetracarboxylic acids and amino alcohols,
2. Tetracarboxylic acids and amino carboxylic acids,
3. Tricarboxylic acids and amino alcohols,
4. Tricarboxylic acids and amino carboxylic acids,
5. Tricarboxylic acids and primary diamines,
6. Hydroxy dicarboxylic acids and amino alcohols,
7. Hydroxy dicarboxylic acids and amino carboxylic acids,
8. Hydroxy dicarboxylic acids and diamines,
9. Dicarboxylic acids and amino diols,
10. Dicarboxylic acids and amino dicarboxylic acids.

Of particular significance in this context are compounds which are built up of aromatic polycarboxylic acids and/or aromatic primary amines. The compounds then developed, in which the imide rings are directly bound to an aromatic ring or even directly participate in an aromatic ring, can be very important in special resin applications, for example in the field of electrical insulation.

The unsaturated polyester resins in accordance with the invention can then be cross-linked in a conventional manner using a process of hompolymerisation or copolymerisation. Viable comonomers are for example styrene, is homologues and its substitution products, allylic vinylic, acrylic or methacrylic acid esters, used alone or in combination with other copolymerisable compounds such as unsaturated ethers or hydrocarbons.

The subsequent cross-linking of the unsaturated polyesters, now modified by imide groups, e.g. cross-linking by the use of radicals to trigger reaction, falls within the scope of the present invention as do the cross-linked products which result. Those products are very versatile in application and can be used in numerous instances in which, for example, stringent requirements in terms of thermal stability are composed. An important field of application is as an electrical insulating material.

Finally, within the framework of the invention it is also possible, in addition to the bifunctional compounds containing the imide groups, and this is also in accordance with the principle set out in the said carrier Applications of the present Applicant, to include in the process of polyester manufacture monofunctional compounds which contain imide groups. Generally speaking, these will be monovalent carboxyic acids and/or hydroxy compounds, which contain at least one 5 or 6-membered imide residue. These compounds correspond to the formula

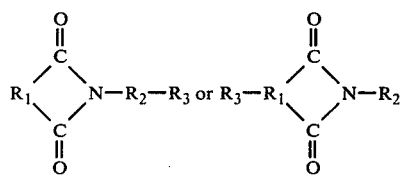

where:
R$_1$ is a bivalent or trivalent aliphatic, cyclic or aromatic residue, with the anhydride-forming carboxy groups at the 1,2, or 1,3, or peri positions.
R$_2$ is a monovalent or bivalent aliphatic or cycloaliphatic residue, or an aryl residue, and
R$_3$ is a monovalent active monofunctional residue suitable for reaction with the yet free, end-position or side-position COOH, OH or NH groups of the unsaturated polyester.

For details here, reference is made to the German Patent Application B 82 293 IVd/30c of the present Applicants.

EXAMPLE 1

In a 2 liter glass flask, equipped with electrical heating regulated by contact thermometer, with stirrer, with nitrogen inlet tube 25 cm. long 5 cm diameter riser tube, distillate thermometer, cooler and condenser (receiver of absorption bulb ?) 449 g of 2,2-dimethylpropandiol and 190.5 g of 4,4'-diaminodiphenylmethane and 2 g of trilithium phosphate were weighed in and, after heating to 100° C., 286.8 g of trimellitic acid anhydride were added. The preparation (which had a small self-heating effect) was rapidly heated to 200° C. and maintained at this temperature for 4 hours. During this phase, 56 ml of volatile reaction products, predominantly water, distilled off. After cooling to 150° C., 0.2 g of hydroquinone and 294 g of maleic acid anhydride were added. The reaction temperature was then raised 10° C. per hour to 210° C. After that, a further 50 ml of distillate had been produced. The acid equivalent was 3440.

After pouring off the resin melt and cooling to room temperature, the material was ground using a pinned disc mill. The result was powder which, when stored at 40° C., did not cake and had a melting range of 88° to 101° C. The powder was mixed as follows:

20 g of resin powder
10 g of asbestos fibre about 12 mm long
56 g of dolomite powder, 20 to 100 $\mu$
10 g of N tertiary butylacrylamide
2 g of dicumyl peroxide
2 g of stearic acid.

After a thorough mixing, a compact was formed at 20 kg/cm$^2$ and 140° C., in the form of a foil between two hard-chrome-plated plates. The compact or pressing retained its shape at press temperature, after removal from the press.

The same resin was dissolved in styrene in the ratio 2:1 and mixed with 2% of tertiary butylperbenzoate in a 50% softener solution. A sample was hardened in a 16 mm diameter test tube at 80° C. for 30 minutes, and finish-hardened for 2 hours by annealing at 150° C. The round rod obtained in this way resisted bending at 150° C. A polyester resin of propandiol, 1,2-isophthalic acid and fumaric acid, with a double-bond equivalent of 350, when treated in the same manner, exhibited significant softening as early as 130° C.

A further 6 g of the styrene solution were placed in a 45 mm diameter dish and hardened at 130° C. for 2 hours. The residual hardened resin case was weighed. After 30 days ageing at 180° C., decomposition of only 4.5% was determined.

1 mm foils produced from the resin solution were subjected to dielectric measurement as follows:

| Measurement at 500 V 50 c/sec as a function of temperature | | | | | | |
|---|---|---|---|---|---|---|
| Temperature in ° C. | Room Temp. | 100 | 120 | 140 | 160 | 180 |
| Mean DK | 3.0 | 3.0 | 3.0 | 3.1 | 3.4 | 3.5 |
| Mean loss factor DK 10$^4$ | 15 | 70 | 90 | 150 | 360 | 350 |

Measurement at Room Temp: and 180° C. as a function of frequency

-continued

| Frequency in kc/sec | 0.1 | 1 | 10 | 100 |
|---|---|---|---|---|
| Room Temp: | | | | |
| Mean DK | 2.8 | 2.8 | 2.8 | 2.7 |
| Mean loss factor DV $10^4$ | 20 | 20 | 35 | 65 |
| 180° C. | | | | |
| Mean DK | 3.3 | 3.1 | 3.1 | 2.9 |
| Mean loss factor DV $10^4$ | 315 | 250 | 190 | 135 |

EXAMPLE 2

In the apparatus of the kind described in Example 1, 450 g of 2,2-dimethylpropandiol were heated to 140° C. and 442 g of the reaction product of 2 mol trimellitic acid anhydride and 1 mol 4,4'-diaminodyphenylmethane (compound 11 of Table 1) and 2 g of trilithiumphosphate, stirred in.

Reaction was carrid out at 200° C. until a clear brown melt had developed, 19 ml of water distilling off in the process. Subsequently, at 150° C. 294 g of malaic acid anhydride and 0.2 g of hydroquinone were added, and the product heated to 200° C. until the acid equivalent was 2200. The OH equivalent was 860, and the molecular weight was determined at 1800 in phenol, by cryoscope.

The unsaturated polyester was poured off and tested as in Example 1. Except for an insignificant difference in terms of gelling time and in degree of decomposition (4% after 28 days at 180° C.), the resins are identical.

EXAMPLE 3

In an apparatus of the kind described in Example 1,
115.5 g of hexamethylene diamine,
467.4 g of 2,2-dimethylpropandiol-1,3
2 g of trilithium phosphate, and
0.2 g of hydroquinone
where heated to 140° C. and slowly mixed with 350 g of trimellitic acid anhydride. After heating to 180° C., the initially developed precipitate dissolved again. Heating to 200° C. was then carried out and the reaction sustained at this temperature for 4 hours. After cooling to 150° C., 294 g of maleic acid anhydride were added and subsequently the product heated to 200° C. again, until a total of 120 ml of distillate had been produced and the acid equivalent was 2030, the OH equivalent 710 and the 2:1 viscosity in styrene was 3800 cP.

The resin melt was cooled to 120° C. and stirred into 500 g of styrene heated to 60° C. A sample of the resin solution, when activated with 1% of tertiary butylperoenzoate, gelled in 46 minutes at 80° C. in a 16 mm test tube. A hardened rod of this sort could be bent very slightly at 80° C. but its mechanical properties altered hardly at all up to 150° C. The degree of decomposition of 180° C., in a hardened resin plate of 5 g weight and 45 mm diameter, was only 7% after 30 days.

EXAMPLE 4

Using the same procedure described in Example 1, an unsaturated polyester resin was produced in which maleic acid anhydride was substituted by molecularly equal quantities of fumaric acid. The styrene solution of this resin was thixotropix. After 14 days storage, the solution had formed a crystalline sludge. As in Example 1, the dielectric values were determined.

Measurement at 500 V and 50 c/sec as a function of temperature
Room
-continued

| Temperature in ° C. | Temp: | 100 | 120 | 140 | 160 | 180 |
|---|---|---|---|---|---|---|
| Mean DK | 2.8 | 2.8 | 2.9 | 2.9 | 3.1 | 3.2 |
| Mean loss factor DV $10^4$ | 20 | 30 | 110 | 140 | 350 | 360 |

Measurement at Room Temp. and 180° C. as a function of frequency

| Frequency in kc/sec. | 0.1 | 1 | 10 | 100 |
|---|---|---|---|---|
| Room Temp: | | | | |
| Mean DK | 2.8 | 2.8 | 2.7 | 2.7 |
| Mean loss factor DV $10^4$ | 20 | 20 | 30 | 50 |
| 180° C. | | | | |
| Mean DK | 3.1 | 3.0 | 2.9 | 2.8 |
| Mean loss factor DV $10^4$ | 300 | 220 | 170 | 130 |

If, in a resin of this kind, the 2,2-dimethylpropandiol is partially substituted by glycol, resins having a more or less marked tendency towards crystallisation can be produced. The tendency to crystallisation can be controlled in such a way that at elevated temperature clear solutions are obtained which when cold solidify to form fluid mixtures of monomers in the crystalline structure of the unsaturated polyester.

Mixtures of this sort, mixed with fillers and hardeners, can be used as fluid pressed masses.

EXAMPLE 5

In the manner described in Example 3, an unsaturated polyester of
456.9 g of neopentylglycol
153 g of trimethylaminomethylcyclohexylamine
316.8 g of trimellitic acid anhydride
294 g of maleic acid anhydride
2 g of trilithium phosphate and
0.2 g of hydroquinone
was manufactured. Reaction was interrupted when the reaction product reached the following values:
COOH equivalent: 2300
OH equivalent: 900
Melting range: 93° to 100° C.

The resin had a tolerance (compatibility) of better than 1:2 with styrene.

The dielectric values as a function of temperature, up to 180° C., bear witness to the good thermal resistance.

Measurement at 500 V and 50 c/sec as a function of temperature

| Temperature in ° C. | Room Temp: | 100 | 120 | 140 | 160 | 180 |
|---|---|---|---|---|---|---|
| Mean DK | 2.8 | 2.8 | 2.- | 2.9 | 3.3 | 3.4 |
| Mean loss factor DV $10^4$ | 20 | 70 | 95 | 170 | 450 | 480 |

Measurement at Room Temp. and 180° C. as a function of frequency

| Frequency in kc/sec. | 0.1 | 1 | 10 | 100 |
|---|---|---|---|---|
| Room Temp: | | | | |
| Mean DK | 2.7 | 2.6 | 2.6 | 2.6 |
| Mean loss factor DV $10^4$ | 20 | 20 | 30 | 65 |
| 180° C. | | | | |
| Mean DK | 3.1 | 2.9 | 2.8 | 2.8 |
| Mean loss factor DV $10^4$ | 360 | 220 | 150 | 100 |

EXAMPLE 6

505.8 g of 2,2-dimethylpropandiol-1,2
240 g of trimellitic acid anhydride
2 g of trilithium phosphate and
0.2 g of hydroquinone were heated to 135° C. in an apparatus of the kind described in Example 1. 189 g of p-aminobenzoic acid were introduced slowly, the temperature rising to 150° C. After heating to 200° C., the mixture formed a clear melt. Reaction was carried out at this temperature until 71 ml of water had distilled off, and this took about 3 hours. Then, the product was cooled to 160° C. and 294 g of maleic acid anhydride added.

After 7 hours at 170° C., the acid equivalent was 2270 and the product was poured off.

The melting range after cooling was 89° to 94° C., and the degree of decomposition after 15 days at 180° C. in a 5 g sample of a hardened specimen, previously dissolved in styrene in a 2:1 solution and mixed with 1% of benzoylperoxide, was 4.3%.

A hardened circular section rod 16 mm in diameter exhibited incipient softening at 150° C.

EXAMPLE 7

In an apparatus of the kind described in Example 1,
248.1 g of pyromellitic acid dianyhdride,
369.9 g of neopentylglycol, and
2 g of trilithium phosphate
were heated to 140° C. After dripping in 138 g of monoethanolamine, heating to 200° C. was effected over a 1 hour period by which time 41 ml of water had distilled off.

From a sample of the melt, it was possible to isolate the diimide defined by formula 3 in Table 1.

After cooling the reaction product to 150° C., 0.2 g of hydroquinone, 172.5 g of tetrahydrophthalic acid, and 294 g of maleic acid anhydride were added. Thereafter, the reaction temperature was raised 10° C. per hour to 200° C. At 200° C., esterification was carried out for about 8 hours until an acid equivalent of 1615 was reached. The resin, which sintered at 80° C., was cooled down, ground and dissolved in styrene in the ratio 2:1 The resin solution had a viscosity of 900 cP. A sample was mixed with 2% methylethylketonehydroperoxide and 0.5% of a 4% solution of cobaltoctoate in styrene, cast in molds, and hardened.

A 1 mm thick casting had suffered a weight loss of 4.4% after 30 days storage at 180° C. A round-section rod 16 mm in diameter failed to bend at 140° C. and exhibited incipient softening at 150° C.

EXAMPLE 8

In an apparatus of the kind described in Example 1, 296.7 g of benzophenonetetracarboxylic acid dianhydride, 363.9 g of 2-dimethylpropandiol-1,3 and 2 g of trilithium phosphate, were weighed in and heated to 150° C. Then, 111.9 g of monoethynolamine were slowly dripped in, slight spontaneous heating being observed. The reaction mixture was then heated to 210° C., and maintained at this temperature until 39 ml of water had distilled off. After cooling to 150° C., 294 g of maleic acid anhydride and 0.2 g of hydroquinone, as well as 139.9 g of tetrahydrophthalic acid anhydride, were added. Then, the reaction temperature was raised 10° C. per hour to 200° C. Esterification was carried out at this temperature until the acid equivalent was 1500. Then, the resin was cast in thin layer form. The melting range was between 75° and 85° C. The resin was finground and 2 parts by weight of this powder were stirred into 1 part by weight of styrene, until a clear solution was obtained. Part of this solution was mixed with 2% of tertiary butylperbenzoate in a 50% softener proportion, and cast between glass plates to form 1 mm foils. The foils were hardened for a 3-hour period at 130° C. The dielectric values of the hardened resin were measured on the basis of the foils:

| Measurement at 500 V and 50 c/sec as a function of temperature | | | | | | |
|---|---|---|---|---|---|---|
| Temperature in ° C. | Room Temp: | 100 | 120 | 140 | 160 | 180 |
| Mean DK | 2.9 | 3.0 | 3.1 | 3.4 | 3.6 | 3.7 |
| Mean loss factor DV $10^4$ | 25 | 100 | 200 | 370 | 400 | 750 |
| Measurement at Room Temp: and 180° C. as a function of frequency | | | | | | |
| Frequency in kc/sec. | | 0.1 | 1 | 10 | 100 | |
| Room Temp: | | | | | | |
| Mean DK | | 2.8 | 2.8 | 2.7 | 2.7 | |
| Mean loss factor DV $10^4$ | | 25 | 28 | 49 | 86 | |
| 180° C. | | | | | | |
| Mean DK | | 3.2 | 3.1 | 3.0 | 2.9 | |
| Mean loss factor DV $10^4$ | | 350 | 300 | 230 | 170 | |

5 g lots of a further proportion of the peroxide-activated resin solution were weighed into 45 mm diameter dishes and hardened for 3 hours at 130° C. The hardened resin samples were weighted out and subsequently aged for 30 days at 180° C. After ageing, a weight loss of 4% was observed.

EXAMPLE 9

In an apparatus of the kind described in Example 1, 172 g of 2,2-dimethylpropandiol, 72.3 g of tetrahydrophthalic acid anhydride and 2 g of trilithium phosphate, were weighed in. The mixture was heated to 140° C. and subsequently 86.5 g of 5-aminoisophthalic acid stirred in. Thereafter, heating to 200° C. was carried out until no more volatile constituents were split off, this taking about 2 hours. After cooling to 150° C., 4 parts by weight of maleic acid anhydride were stirred in. The reaction temperature was then raised 10° C. per hour to 200° C. and maintained at this level for 2 hours. Subsequently, the acid equivalent was 1800. The product was poured off, reduced to a fine powder and the powder stirred into styrene to produce a 60% solution. The solution was mixed with 2% of benzoylperoxide, gelled at 80° C. and finally hardened at 150° C. 16 mm diameter round-section rods produced in this way exhibited no softening at 150° C. 5 g dish-moulded specimens of the kind described in the other Examples, exhibited a weight loss of 3.4% after 30 days ageing at 180° C.

EXAMPLE 10

In an apparatus similar to that described in Example 1, but using a 1 liter flask, 105.5 g of tetrahydrophthalic acid anhydride and 63.2 g of aminopropandiol, were weighed in. After heating to about 50° C., exothermal reaction commenced, the reaction mixture heating itself to 110° C. Subsequently, heating was continued to 200° C. and the temperature maintained at this level until 12 ml of water had distilled off. After cooling to 150° C., 105 g of tetrahydrophthalic acid anhydride, 147 g of maleic acid anhydride, 156 g of 2,2-dimethylpropandiol, 1 g of trilithium phosphate and 0.1 g of hydroquinone, were added. Then, the temperature was raised to 200° C. and maintained there until the acid equivalent was observed to be 1800. The solid resin was then poured into flat dishes. It had a melting range of 65 to 78° C. The resin was powdered and, the powder dissolved in the ratio 2:1 in styrene, mixed with 2% of tertiary butylperbenzoate in 50% of softener, and from this mouldings were produced. The degree of decomposition after 30 days at 180° was 2.7%.

The dielectric values showed the material to have good resistance up to 180° C. A 16 mm diameter round-section rod showed no significant softening at 150° C.

| Measurement at 500 V and 50 c/sec. as a function of temperature | | | | | | |
|---|---|---|---|---|---|---|
| Temperature in ° C. | Room Temp: | 100 | 120 | 140 | 160 | 180 |
| Mean DK | 2.9 | 3.0 | 3.2 | 3.4 | 3.6 | 3.6 |
| Mean loss factor DV $10^4$ | | 50 | 75 | 140 | 270 | 250 | 260 |
| Frequency in kc/s | 0.1 | 1 | | 10 | | 100 |
| Room Temp: | | | | | | |
| Mean DK | 2.6 | 2.6 | | <.6 | | 2.6 |
| Mean loss factor DV $10^4$ | 25 | 30 | | 50 | | 90 |
| 180° C. | | | | | | |
| Mean DK | 3.1 | 3.0 | | 2.9 | | 2.8 |
| Mean loss factor DV $10^4$ | 220 | 200 | | 160 | | 125 |

EXAMPLE 11

In an apparatus of the kind described in Example 1, 291 g of trimellitic acid anhydride, 124 g of glycocol, 536 g of 2,2-dimethylpropandiol and 2 g of trilithium phosphate were weighed in, and heated in the course of 2 hours to 200° C., 75 mm of distillate distilling off in the process. After cooling to 1600° 294 g of maleic acid anhydride and 0.2 g of hydroquinone were added and the temperature then raised over 2 hours to 200° C. and maintained there until the acid equivalent was 2600, the time taken for this being 4 hours. Then, the resin was poured off, powdered after cooling and part of the powder dissolved in styrene in the ratio 2:1 The solution was mixed with 2% of tertiary butylperbenzoate in 50% of softeners, and mouldings produced from this. 16 mm diameter round-section rods were produced, the resin being gelled at 80° C. in 2 hours, and being hardened for 3 hours at 130° C. The mouldings exhibited slight softening at 150° C. Also, 1 mm foils were produced in order to determine the dielectric values.

| Measurement at 500 V and 50 c/sec. as a function of temperature | | | | | | |
|---|---|---|---|---|---|---|
| Temperature in ° C. | Room Temp: | 100 | 140 | 160 | 180 | 120 |
| Mean DK | 2.9 | 2.9 | 3.3 | 3.4 | 3.4 | 3.1 |
| Mean loss factor DV $10^4$ | 25 | 100 | 310 | 220 | 330 | 220 |
| Measurement at Room Temp: and 180° C. as a function of frequency | | | | | | |
| Frequency in kc/s | 0.1 | 1 | | 10 | | 100 |
| Room Temp: | | | | | | |
| Mean DK | 2.7 | 2.7 | | 2.6 | | 2.6 |
| Mean loss factor DV $10^4$ | 30 | 25 | | 35 | | 60 |
| 180° C. | | | | | | |
| Mean DK | 3.0 | 2.9 | | 2.9 | | 2.8 |
| Mean loss factor DV $10^4$ | 240 | 200 | | 160 | | 130 |

The degree of decomposition of 5 g mouldings produced in the 45 mm diameter dish, was 4.3% after 30 days at 180° C.

EXAMPLE 12

In an apparatus of the kind described in Example 1, 1.2 mol of 2,2-dimethylpropandiol, and 1 mol of trimellitic acid anhydride were heated at 140° C. and subsequently 1 mol of monoethanolamine dripped in, the temperature rising to 160° C. Then, heating to 200° C. was carried out and the temperature maintained at this level until no further volatile constituents split off. In this time, 37 ml of a distillate consisting substantially of water, had distilled off. After cooling to 150° C., 1 mol of maleic acid anhydride and 0.1 g of hydroquinone, were added. The reaction mixture was heated again to 200° C. and maintained at this temperature for 5 hours, after which time the acid equivalent was 1600. After cooling, the centering point was determined and was found to be 70° C. The resin was finally powdered and mixed in the ratio 2:1 in styrene. The styrene solution was mixed with 1% of tertiary butylperocoate. Using this solution, coils were impregnated in order to determine the caking properties in accordance with VDE 0360, and were hardened for 3 hours at 120° C. The caking factor at room temperature was 16, and at 20° C. was 9.6.

We claim:

1. Copolymerizable polyester resin containing within the polymer chain at least one multivalent residue containing at least one 5- or 6-member cyclic imide group, and olefinic unsaturation provided by olefinic polycarboxylic acid residues.

2. Polyester resin as claimed in claim 1, characterised in that the resin contains a residue of dicarboxylic acid, a dialcohol, or an hydroxy carboxylic acid, which contains the cyclic imide group.

3. Polyester resin as claimed in claim 10, containing a residue of a monocarboxylic acid or a monoalcohol containing at least one 5- or 6-member cyclic imide group.

4. Polyester resin as claimed in claim 1, containing a residue of a diol having branched C-chains.

5. Polyester resin according to claim 3, said residue of a diol being a residue of neopentylglycol.

6. Polyester resin according to claim 1, said multivalent residue being a divalent residue contained in the polymer chain and containing a 5-membered imide ring.

7. Polyester resin according to claim 6, said imide ring being directly bound to an aromatic ring.

8. Molding composition containing as essential components a resin according to claim 16, and a cross-linking agent therefor.

9. Molding composition according to claim 8, the cross-linking agent being a compound providing radicals for causing the cross-linking.

10. Molding composition according to claim 8, the cross-linking agent being styrene or an allylic, vinylic, acrylic or methacrylic acid ester.

11. Molding composition according to claim 8, the cross-linking agent being styrene.

12. Polyester resin according to claim 1, being the condensation product of:
(a) the reaction product obtained by heating at 200° C. until a brown melt is formed, of about 0.8 moles

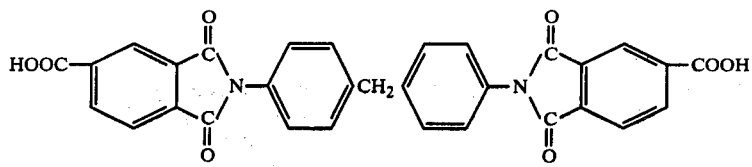

and about 4.3 moles of 2,2-dimethylpropandiol, in the presence of an esterification catalyst, and (b) about 3 moles of maleic acid anhydride, having an acid equivalent of about 2200 and an OH equivalent of about 860 and a molecular weight of about 1800 in phenol by cryoscope.

13. Polyester resin as claimed in claim 7, said cyclic imide group being a 5-member group of the formula:

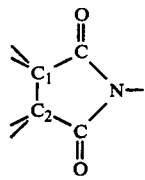

in which $C_1$ and $C_2$ are part of an aromatic ring.

14. Shaped article formed by cross-linking a molding composition according to claim 8, the cross-linking being a crossing of the resin by the cross linking agent.

15. Process of producing a molded article having high thermal resistance, and low dependence of dielectric loss factor on temperature, which comprises:
(a) molding an unsaturated polyester resin according to claim 1, into the shape of said article,
(b) cross-linking the resin by radical homopolymerization or copolymerization with copolymerizable monomers.

16. Polyester resin as claimed in claim 1, which is the condensation product of multivalent alcohol, multivalent carboxylic acid including the olefinic polycarboxylic acid or esterifying derivatives thereof and a multifunctional reactant containing the 5- or 6-membered cyclic imide group, with the proviso that hydroxy carboxylic acid or an esterifying derivative thereof can be employed as replacement for multivalent alcohol and multivalent carboxylic acid other than said olefinic polycarboxylic acid.

* * * * *

UNITED STATES PATENT AND TRADEMARK OFFICE
CERTIFICATE OF CORRECTION

PATENT NO. : 4146703  
DATED : March 27, 1979  
INVENTOR(S) : Karl Schmidt et al.

It is certified that error appears in the above-identified patent and that said Letters Patent are hereby corrected as shown below:

Title page, add:
--[30] Foreign Application Priority Data Dec. 16, 1966 Austria....A 11637/66--

Title page, References Cited, under Foreign Patent Documents, change "260/75 M" to --260/75 N--.

Col. 11, line 44 change "carrier" to --earlier--.

Col. 13, line 38 change "where" to --were--.

Col. 13, line 49 change "butylpero-" to --butylperb---.

Col. 15, line 58 change "139.9" to --138.9--.

Col. 15, line 63 change "fin-" to --fine---.

Co. 17, cancel the table following line 5, and replace it with:

UNITED STATES PATENT OFFICE
CERTIFICATE OF CORRECTION

Patent No. 4,146,703   Dated March 27, 1979

Inventor(s) Karl Schmidt et al.

It is certified that error appears in the above-identified patent and that said Letters Patent are hereby corrected as shown below:

Measurement at 500 V and 50 c/sec. as a function of temperature

| Temperature in °C | Room Temp: | 100 | 120 | 140 | 160 | 180 |
|---|---|---|---|---|---|---|
| Mean DK | 2.9 | 3.0 | 3.2 | 3.4 | 3.6 | 3.6 |
| Mean loss factor DV $10^4$ | 50 | 75 | 140 | 270 | 250 | 260 |

| Frequency in kc/s | 0.1 | 1 | 10 | 100 |
|---|---|---|---|---|
| Room Temp: | | | | |
| Mean DK | 2.6 | 2.6 | <.6 | 2.6 |
| Mean loss factor DV $10^4$ | 25 | 30 | 50 | 90 |
| 180°C | | | | |
| Mean DK | 3.1 | 3.0 | 2.9 | 2.8 |
| Mean loss factor DV $10^4$ | 220 | 200 | 160 | 125 |

UNITED STATES PATENT OFFICE
CERTIFICATE OF CORRECTION

Patent No. 4,146,703            Dated March 27, 1979

Inventor(s) Karl Schmidt et al.

It is certified that error appears in the above-identified patent and that said Letters Patent are hereby corrected as shown below:

Col. 18, line 40 change "10" to --1--.

Col. 18, line 46 change "3" to --4--.

Col. 18, line 54 change "16" to --7--.

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*